(12) United States Patent
Chen et al.

(10) Patent No.: US 12,334,734 B2
(45) Date of Patent: Jun. 17, 2025

(54) SYSTEMS AND METHODS FOR BLOCKCHAIN-BASED VIRTUAL POWER PLANT MANAGEMENT

(71) Applicant: SOUTH CHINA UNIVERSITY OF TECHNOLOGY, Guangdong (CN)

(72) Inventors: Haoyong Chen, Guangzhou (CN); Baomin Li, Guangzhou (CN); He'nan Hu, Guangzhou (CN); Zhi Li, Guangzhou (CN); Weichao Wang, Guangzhou (CN)

(73) Assignee: SOUTH CHINA UNIVERSITY OF TECHNOLOGY, Guangzhou (CN)

( * ) Notice: Subject to any disclaimer, the term of this patent is extended or adjusted under 35 U.S.C. 154(b) by 0 days.

(21) Appl. No.: 18/757,446

(22) Filed: Jun. 27, 2024

(65) Prior Publication Data

US 2025/0167550 A1    May 22, 2025

(30) Foreign Application Priority Data

Nov. 20, 2023   (CN) .......................... 202311547035.2

(51) Int. Cl.
*H02J 3/14*   (2006.01)
*H02J 3/00*   (2006.01)
(Continued)

(52) U.S. Cl.
CPC .............. *H02J 3/144* (2020.01); *H02J 3/003* (2020.01); *H04L 9/3263* (2013.01); *H04L 9/50* (2022.05)

(58) Field of Classification Search
CPC .......... H02J 3/144; H02J 3/003; H04L 9/3263
See application file for complete search history.

(56) References Cited

U.S. PATENT DOCUMENTS

| 10,804,702 B2 * | 10/2020 | Claessens | G06Q 50/06 |
| 2010/0332373 A1 * | 12/2010 | Crabtree | G06Q 40/04 |
| | | | 709/224 |

(Continued)

FOREIGN PATENT DOCUMENTS

| CN | 106886603 A | * 6/2017 | ......... G06F 16/2471 |
| CN | 114118734 A | 3/2022 | |

(Continued)

OTHER PUBLICATIONS

Ju, Liwei, et al. "Multi-objective stochastic scheduling optimization model for connecting a virtual power plant to wind-photovoltaic-electric vehicles considering uncertainties and demand response." Energy Conversion and Management 128 (2016): 160-177. (Year: 2016).*

(Continued)

*Primary Examiner* — Robert E Fennema
*Assistant Examiner* — Vi N Tran
(74) *Attorney, Agent, or Firm* — PORUS IP LLC (57) ABSTRACT

Disclosed is a system and a method for blockchain-based virtual power management, relating to the field of virtual power plants. The system mainly includes three modules: an event-driven based demand rapid response and flexible resource optimal allocation module configured to adjust power supply and demand in real time according to power demand information and available resource information of an industrial park; a blockchain-based data collaboration module configured to establish a data sharing and transaction environment among various participants of a virtual power plant; and a visualization management module configured to provide a user interface for displaying, in real time, operational status and power transactions of the virtual power plant in the user interface. The system can effectively (Continued)

manage virtual power plants, enhancing the efficiency and transparency of power supply.

7 Claims, 2 Drawing Sheets

(51) Int. Cl.
*H04L 9/00* (2022.01)
*H04L 9/32* (2006.01)

(56) References Cited

U.S. PATENT DOCUMENTS

| | | | |
|---|---|---|---|
| 2013/0261825 A1* | 10/2013 | Han | G06F 1/26 700/291 |
| 2021/0216934 A1* | 7/2021 | Riverso | H02J 3/381 |
| 2021/0382870 A1 | 12/2021 | Yang | |
| 2022/0004307 A1* | 1/2022 | Simpson | G06F 1/1632 |
| 2023/0222531 A1* | 7/2023 | Cella | G06Q 10/0631 705/7.31 |
| 2024/0170963 A1* | 5/2024 | Zhou | G06Q 50/06 |
| 2024/0193021 A1* | 6/2024 | Pateromichelakis | H04L 43/10 |

FOREIGN PATENT DOCUMENTS

| | | |
|---|---|---|
| CN | 111882111 B | 7/2022 |
| CN | 116308445 A | 6/2023 |

OTHER PUBLICATIONS

Machine Translation for CN-106886603-A, obtained Oct. 2024 (Year: 2024).*
First Office Action in Chinese Application No. 202311547035.2 mailed on Dec. 29, 2023, 15 pages.
Notification to Grant Patent Right for Invention in Chinese Application No. 202311547035.2 mailed on Feb. 7, 2024, 2 pages.

* cited by examiner

SYSTEMS AND METHODS FOR BLOCKCHAIN-BASED VIRTUAL POWER PLANT MANAGEMENT

CROSS-REFERENCE TO RELATED APPLICATIONS

This application claims priority to Chinese Patent Application No. 202311547035.2, filed on Nov. 20, 2023, the entire contents of each of which are incorporated herein by reference.

TECHNICAL FIELD

The present disclosure relates to the field of virtual power plan, and in particular, to a method and a system for blockchain-based virtual power plant management.

BACKGROUND

In modern power systems, a virtual power plant (VPP) represents a novel power system management model. The virtual power plant integrates various power resources such as distributed generation, energy storage devices, and electric vehicles through an information network to form a power system with a certain scale and function, capable of providing power and related services to a grid. However, due to diverse types, large quantities, and wide distribution of power resources involved in the VPP, its operational management faces significant challenges.

Traditional systems for VPP management primarily rely on a centralized management model. While the centralized management model may achieve centralized management of power resources, it often encounters issues of inefficiency, poor data transparency, and difficulty in real-time response when dealing with large-scale, distributed power resources. Additionally, since power transaction information is mainly transmitted through a central server, any malfunction of the central server may impact the entire system's operation.

In recent years, blockchain technology, with its characteristics of decentralization, data transparency, and immutability, has been widely applied in fields such as finance, supply chain, and the Internet of Things (IoT). However, how to apply the blockchain technology to the management of VPPs to achieve better VPP management remains an urgent problem to be solved.

SUMMARY

Some embodiments of the present disclosure provide system for blockchain-based virtual power plant management. The system may include: an event-driven based demand rapid response and flexible resource optimal allocation module configured to adjust power supply and demand in real time according to power demand information and available resource information of an industrial park; a blockchain-based data collaboration module configured to establish a data sharing and transaction environment among various participants of a virtual power plant based on an output of the event-driven based demand rapid response and flexible resource optimal allocation module; and a visualization management module configured to provide a user interface for displaying, in real time, operational status and power transactions of the virtual power plant in the user interface based on the output of the event-driven based demand rapid response and flexible resource optimal allocation module and an output of the blockchain-based data collaboration module.

In some embodiments, the event-driven based demand rapid response and flexible resource optimal allocation module further includes a first demand forecasting sub-module, a first resource aggregation sub-module, and a first distributed resource sub-module. The first demand forecasting sub-module is configured to: collect, analyze, and count specification parameters of flexible resources, classify and visually model the flexible resources, establish a linear correlation function and/or a non-linear correlation function of each type of the flexible resources, extract a key index of each type of the flexible resources, and establish a time, space, and energy based demand response model corresponding to the industrial park for different demand scenarios according to time periods and capacities of past participation of the industrial park in grid demand response. The first resource aggregation sub-module is configured to determine a count of aggregators participating in flexible resource optimal allocation, coordinate power outputs and/or power consumptions of different units, distributed power sources, and other power-using devices, and perform coordinated operation and capacity optimization with a device connected to the industrial park based on a response time, a response capacity, a response rate, and a priority of each type of flexible resources of each aggregator in a process of participating in a distributed transaction. The first distributed resource sub-module is configured to obtain an aggregation allocation attribution and a demand response time slot of each type of the flexible resources by performing flexible resource optimization solving, determine an actual response demand on a grid side according to an actual operation situation within a day, and sequentially call the aggregators under different demand scenarios according to the priority of the flexible resources until a user demand is satisfied.

In some embodiments, the event-driven based demand rapid response and flexible resource optimal allocation module further includes an optimization model, the optimization model including decision variables, an objective function, and constraints. The decision variables at least include the aggregation allocation attribution for the demand response time slot of each of the aggregators, the aggregation allocation attribution being set as $M_{m,t}^{a}$, $N_{m,t}^{a}$, wherein $M_{m,t}^{a}$ denotes a state variable with a value between 0 and 1, representing a start response time slot of a flexible resource m and an aggregation allocation attribution of an aggregator a at the start response time slot, if the flexible resource m starts responding at a time slot t and is assigned to the aggregator a at the same time, $M_{m,t}^{a}=1$, otherwise $M_{m,t}^{a}=0$; $N_{m,t}^{a}$ is a state variable with a value between 0 and 1, representing a current response time slot of the flexible resource m and an aggregation allocation attribution of the aggregator a in the current response time slot, if the flexible resource m has responded at the time slot t and is assigned to the aggregator a, $N_{m,t}^{a}=1$, otherwise $N_{m,t}^{a}=0$, wherein $m \in M$, $t \in T$, and $a \in A$, M denotes a collection of the flexible resources, T denotes a collection of the demand response time slots, and A denotes a collection of the aggregators. The objective function is a function for determining a minimum value of a unit aggregator's cost of a current demand response, the objective function being set as $f(a)=\min \Sigma_{t \in T} \Sigma_{m \in M} \Sigma_{a \in A} w_a c_m p_m N_{m,t}^{a}$, wherein $w_a$ denotes a weight of the aggregator a as a percentage of an aggregator aggregation, $c_m$ denotes a cost per unit of capacity consumed by the flexible resource m within the current demand response, and $p_m$ denotes a capacity of the flexible resource m within the current demand response.

The constraints include: an aggregation allocation limitation of the start response time slot and the current response time slot for the flexible resource m, the aggregated allocation limitation being set as $$\begin{cases} N_{m,t}^a \geq M_{m,t}^a \\ N_{m,t}^a - N_{m,t-1}^a \leq M_{m,t}^a \end{cases};$$

a limitation for a count of aggregated allocations and dispatches for the flexible resource m, the limitation for the count of aggregated allocations and dispatches being set as $\Sigma_{t \in T} \Sigma_{a \in A} M_{m,t}^a \leq 1$; a maximum response duration limitation for the flexible resource m, the maximum response duration limitation being set as $\Sigma_{a \in A} \Sigma_{t \in T} \Sigma_{m,t}^a \leq T_m^{max}$, wherein $T_m^{max}$ is a maximum response duration of the flexible resource m; guaranteeing that flexible resources having a backward and forward coupling relationship are associated; a minimum response capacity limitation for the aggregator a, the minimum response capacity limitation being set as $\Sigma_{m \in m} N_{m,t}^a P_m \gamma_m \geq P_D^a$, wherein $P_m$ denotes a response capacity of the flexible resource m, $P_D^a$ denotes a minimum response capacity required after aggregation of flexible resources of the aggregator a, and $\gamma_m$ denotes a confidence factor for timely response corresponding to the flexible resource m; a minimum response speed limitation and a minimum recovery speed limitation required after the aggregation of the flexible resources of the aggregator a, the minimum response speed limitation and the minimum recovery speed limitation being set as $$\begin{cases} \Sigma_{m \in M} N_{m,t}^a h_m^M \geq H_M^a \\ \Sigma_{m \in M} N_{m,t}^a h_m^D \geq H_D^a \end{cases},$$

wherein $h_m^M$ and $h_m^D$ denote a response speed and a recovery speed of the flexible resource m, respectively, and $H_M^a$ and $H_D^a$ denote an overall minimum response speed and a minimum recovery speed of the aggregator a, respectively Some embodiments of the present disclosure provide a method for blockchain-based virtual power plant management, which is applied to the system for blockchain-based virtual power plant management described above, wherein the method is executed by the system, and the method comprises: adjusting power supply and demand in real time according to power demand information and available resource information of an industrial park; establishing a data sharing and transaction environment among various participants in a virtual power plant; and providing a user interface for displaying, in real time, operational status and power transactions of the virtual power plant in the user interface.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In order to more clearly illustrate the technical solutions of the embodiments of the present disclosure, the accompanying drawings to be used in the description of the embodiments will be briefly described below. Obviously, the accompanying drawings in the following description are only some examples or embodiments of the present disclosure, and that the present disclosure may be applied to other similar scenarios in accordance with these drawings without creative labor for those of ordinary skill in the art. Unless obviously acquired from the context or the context illustrates otherwise, the same numeral in the drawings refers to the same structure or operation.

It should be understood that "system," "device," "unit," and/or "module" as used herein is a way to distinguish between different components, elements, parts, sections, or assemblies at different levels. However, these words may be replaced by other expressions if they accomplish the same purpose.

As indicated in the present disclosure and in the claims, the singular forms "a," "an," and "the" may be intended to include the plural forms as well, unless the context clearly indicates otherwise. In general, the terms "comprise," "comprises," and/or "comprising," "include," "includes," and/or "including," when used in this disclosure, specify the presence of stated features, integers, steps, operations, elements, and/or components, but do not preclude the presence or addition of one or more other features, integers, steps, operations, elements, components, and/or groups thereof.

Flowcharts are used in the present disclosure to illustrate the operations performed by the system according to some embodiments of the present disclosure. It should be understood that the operations described herein are not necessarily executed in a specific order. Instead, the operations may be executed in reverse order or simultaneously. Additionally, one or more other operations may be added to these processes, or one or more operations may be removed from these processes.

To achieve better virtual power plant (VPP) management, some embodiments of the present disclosure provide a system and a method for blockchain-based virtual power plant management. The system and the method adjust power supply and demand in real-time to meet power needs of an industrial park and optimize resource allocation.

Figure 1:
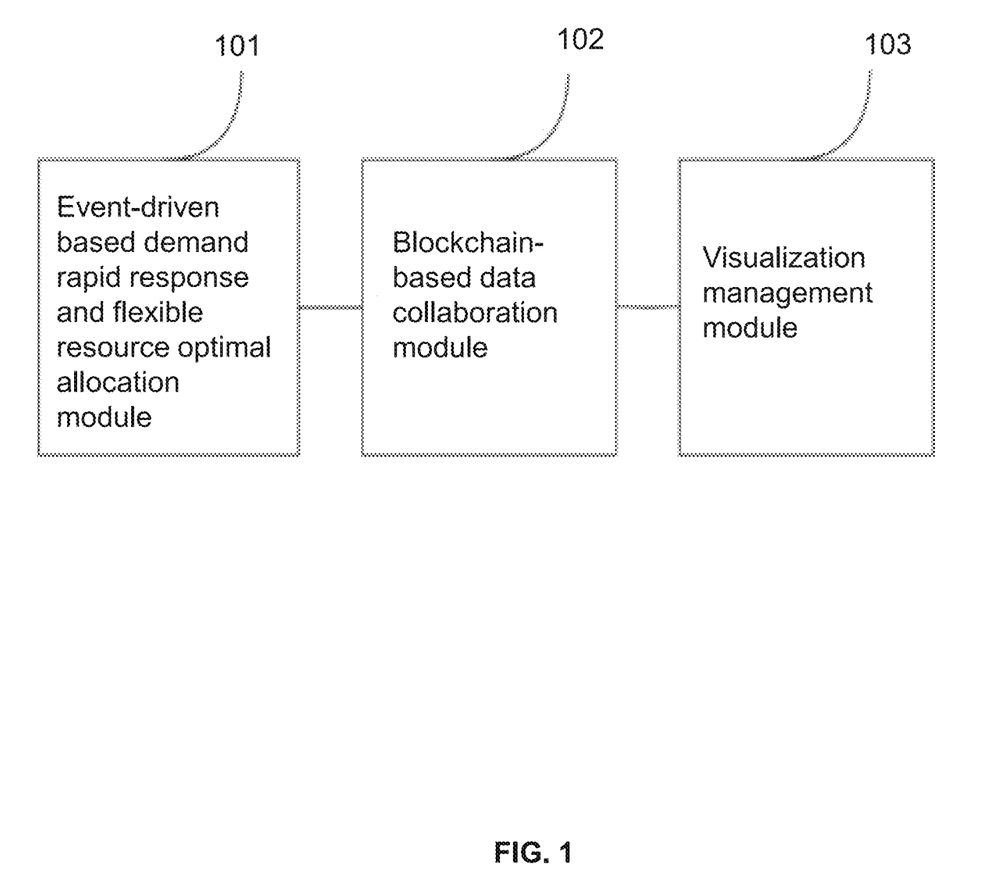
FIG. 1 is a schematic diagram illustrating a system for blockchain-based virtual power plant management according to some embodiments of the present disclosure.

Some embodiments of the present disclosure provide a system for blockchain-based virtual power plant management. Referring to FIG. 1, this figure illustrates a schematic diagram of a first embodiment of the present disclosure. Descriptions of the first embodiment of the system for blockchain-based virtual power plant management are provided in conjunction with FIG. 1.

In subsequent descriptions, the system for blockchain-based virtual power plant management may be referred to as the VPP management system. The VPP management system includes an event-driven based demand rapid response and flexible resource optimal allocation module (hereinafter, optimal allocation module) 101, a blockchain-based data collaboration module 102, and a visualization management module 103.

A VPP is an intelligent control technology and business model that aggregates adjustable resources on a load side, which are otherwise invisible and uncontrollable in grid dispatching, into controllable and tradable units that directly participate in grid dispatch control and electricity market transactions. In some embodiments, participants in the VPP are divided into three categories: service buyers (e.g., grids and power plants), market operators (e.g., centralized control platforms), and service providers (e.g., aggregators).

An aggregator refers to an entity that integrates power users capable of demand response to participate in demand-side response. For example, the aggregator may be an electricity retail company such as a photovoltaic aggregator or a company with a qualification of "industrial power demand-side management service institution" such as a load aggregator.

Demand Response (DR) refers to a behavior where power users respond to a signal or a price change from a power supplier by reducing or shifting their electricity load to maintain grid stability and control rising electricity prices when electricity market prices rise or system reliability is threatened.

Flexible resources refer to power resources related to power supply or load that may be flexibly dispatched. For example, the flexible resources may include distributed generation, energy storage devices, wind turbines, solar panels, factory equipment, etc.

The optimal allocation module 101 is a core component of the VPP management system. The optimal allocation module may be configured to adjust power supply and demand in real-time according to power demand information and available resource information of an industrial park to meet power needs of the industrial park and optimize resource allocation.

In some embodiments, the optimal allocation module 101 may be configured to collect the power demand information of the industrial park. The power demand information of the industrial park refers to relevant information reflecting the power demand of the industrial park. For example, the power demand information may include internal power consumption equipment in the industrial park, electricity market price information, weather forecasts, etc. The power demand information may be used to predict the power demand of the industrial park in a future period.

In some embodiments, the optimal allocation module 101 may be configured to collect available resource information of the industrial park, such as information related to distributed generation, energy storage devices, electric vehicles, etc. (e.g., power, battery capacity). The available resource information refers to flexible resources that may be used for power supply and is utilized to assess a power supply capability of the industrial park for a future period.

In some embodiments, the optimal allocation module 101 may be configured to adjust the power supply and demand of the industrial park in real-time based on the power demand information and the available resource information. For example, the optimal allocation module may adjust a power output, schedule charging and discharging of energy storage devices, and start or stop certain power sources based on a preset strategy.

The preset strategy refers to a power supply strategy pre-defined for different power demand scenarios. For example, the preset strategy may dictate that when the power demand of the industrial park suddenly increases beyond an increase threshold, the optimal allocation module may activate a backup power source (e.g., a diesel generator) to compensate for the power shortage. Conversely, if the power demand decreases below a decrease threshold, some power sources may be shut down to save energy. The increase and decrease thresholds may be predefined manually.

In some embodiments, the optimal allocation module 101 may be configured to output configuration data. The configuration data refers to data related to configuration of the flexible resources. For example, the configuration data may include current power supply and demand, projected future power supply and demand, current resource allocation, etc.

In some embodiments, the configuration data may be used to drive the operation of other modules. For example, the blockchain-based data collaboration module may establish a data sharing and transaction environment based on the configuration data, and the visualization management module may display an operational status of the VPP and a power transaction condition through the configuration data.

In some embodiments of the present disclosure, by adjusting the power supply and demand in real-time based on the power demand information and the available resource information, the optimal allocation module can meet the power needs of the industrial park, optimize resource allocation, reduce power costs, reduce carbon emissions, and achieve real-time management of the VPP.

In some embodiments, the optimal allocation module may include a perception layer, an edge layer, and a cloud layer.

The perception layer is configured to collect data from a data source. In some embodiments, the perception layer may include a device sub-layer and a monitoring sub-layer. The device sub-layer is a device resource management layer connected to a smart device via a wireless network. The monitoring sub-layer is configured to conduct real-time monitoring of specific metrics of the smart device. For example, the monitoring sub-layer may perform real-time monitoring of the specific metrics of the smart device through a monitoring device and communicate using a standardized protocols (e.g., the Matrix protocol), thereby generating the demand response and flexible resource data in real-time.

The data source refers to a source device, a source database, etc., that collects data. The smart device refers to a device with a network interconnectivity capability. The specific metrics of the smart device may include electrical parameters (e.g., voltage and current), operational status, fault codes, etc.

In some embodiments, the perception layer may include a device sub-layer and a monitoring sub-layer. The device sub-layer connects to a smart device via a wireless network (e.g., Bluetooth, WiFi, etc.), forming a device resource management layer. The monitoring sub-layer uses a monitoring device (e.g., a sensor, a camera, etc.) to perform real-time monitoring of the specific metrics of the smart device.

In some embodiments of the present disclosure, the device sub-layer communicates effectively with the monitoring sub-layer using a standardized protocol, generating the demand response and flexible resource data in real-time, which may support effective control of events by the industrial park's virtual grid intelligent gateway.

The edge layer is configured to perform event-oriented data integration. In some embodiments, the edge layer may, based on a blockchain network with P2P as communication and an event processor driven by a smart contract, integrates and utilizes data flowing from the perception layer based on different events and, and constructs an event-driven based demand rapid response and flexible resource optimal allocation process by analyzing an event-driven workflow.

The event-driven workflow refers to a process of handling and responding to events based on a series of preset rules, conditions, and operational steps. In some embodiments, different scenarios may correspond to different events, with each event corresponding to a specific event-driven workflow. For example, an aggregator may need to aggregate resources, corresponding to a resource aggregation workflow. A technician may write a corresponding smart contract, which automatically execute an appropriate logic based on a preset event workflow when an event occurs. During operation, the smart device may trigger various events, such as workflow initiation, task completion, etc.

In some embodiments, the edge layer may, based on a blockchain network with P2P as communication and an event processor driven by a smart contract, integrates and utilizes data flowing from the perception layer based on different events and, and constructs an event-driven based demand rapid response and flexible resource optimal allocation process by analyzing an event-driven workflow.

For example, in a virtual power plant of an industrial park, when each smart device (e.g., a wind turbine, a solar panel, etc.) is equipped with a sensor, the sensor may monitor an operational status and a power output of the smart device in real-time, and send the related data to the edge layer.

In some embodiments, the edge layer may integrate the aforementioned data based on a P2P blockchain network to form a complete real-time profile of device operation and power output. For example, the edge layer integrates and stores data received from different smart devices on the blockchain to determine the operational status and power output of each smart device to form the real-time profile.

In some embodiments, the event processor driven by the smart contract may execute corresponding logic based on the aforementioned data and preset event workflow when an event occurs, thereby achieving rapid demand response and flexible resource optimization. For example, the preset event workflow may include activating a backup power source when the power output of a wind turbine falls below a preset threshold.

In some embodiments of the present disclosure, by analyzing the event-driven workflow through the edge layer, event-driven based demand rapid response and flexible resource optimal allocation process is constructed, which allows the VPP to achieve real-time management of devices, thereby improving the efficiency and stability of power supply.

The cloud layer is configured to perform data processing. In some embodiments, the cloud layer may perform as a large-scale data processing center that builds a regulation center for multi-party negotiation scenarios and a data-driven computing center to optimize a device resource management and event service management system of the VPP.

In some embodiments, the cloud layer may optimize the VPP's device resource management and an event service management system. For example, the cloud layer may monitor and optimize a device status of the VPP in real-time, such as scheduling shutdowns for a high-energy-consuming factory device.

The event service management system is a system used to monitor, analyze, and respond to various types of events to ensure service availability, performance, and security.

The regulation center is a part that negotiates and regulates multi-party strategies based on data. The computing center is a part that processes and analyzes data of the VPP.

In some embodiments, the cloud layer may perform as a large-scale data processing center to construct a regulation center for multi-party negotiation scenarios and a data-driven computing center.

During the operation of the VPP, a large amount of data is generated, such as device operation data, power demand and supply data, transaction data, etc. In some embodiments, the cloud layer may construct the data-driven computing center to perform in-depth analysis of the collected data.

For example, the cloud layer may perform as a data processing center, constructing a data-driven computing center to process historical data generated during the operation of the VPP, such as data cleaning, feature extraction, etc. Using machine learning and artificial intelligence techniques, such as time series analysis, the cloud layer may predict a future power demand and a supply condition and optimize a device operation strategy. For example, if a prediction indicates that the power demand for a next day in the VPP will exceed an existing power supply, the operation strategy for the next day may be adjusted to increase an output of some power generation devices and activate a backup capacity.

In some embodiments, the cloud layer may also construct a regulation center for multi-party negotiation scenarios. For example, when a plurality of VPPs need to work collaboratively, the regulation center may coordinate the power supply and demand of each VPP based on future power demand and supply conditions predicted by the computing center. For example, if a VPP A generates excess wind power during a specific period while a VPP B needs additional power, the regulation center may facilitate a negotiation between a buyer and a seller, enabling the VPP A to sell power to the VPP B at an appropriate price.

In some embodiments of the present disclosure, the cloud layer provides robust data processing capabilities, supporting large-scale data analysis and decision-making, thereby improving the operational efficiency and effectiveness of the VPP.

The optimal allocation module includes the perception layer, the edge layer, and the cloud layer, forming an "end-edge-cloud" data collaboration framework, which is used to optimize the coordination of various parties in demand response and address issues encountered in business implementation.

In some embodiments of the present disclosure, the "end-edge-cloud" data collaboration framework can achieve rapid demand response and resource optimization for the VPP through real-time data collection by the perception layer, event-driven data integration by the edge layer, and flexible and scalable data processing by the cloud layer.

In some embodiments, the optimal allocation module may further include a demand forecasting sub-module, a resource aggregation sub-module, and a distributed resource sub-module.

The demand forecasting sub-module is configured to forecast demand in a microgrid electricity trading scenario within the industrial park. The microgrid electricity trading scenario refers to VPPs, as an entity, participating in external energy market trading as a price taker.

In the microgrid electricity trading scenario, the VPP accepts trades in an electricity spot market based on a pre-clearance mechanism. The demand forecasting sub-module is configured to construct a demand prediction model based on day-ahead data of an edge-side flexible resource, determine a clearing result through real-time bidding with a power producer based on a prediction result of the demand prediction model, and release the clearing result in real-time to market players.

The pre-clearance mechanism is an electricity market trading mechanism where the power demand and supply conditions are determined in advance before market transactions. The pre-clearance mechanism allows for more efficient and accurate matching of demand and supply during actual transactions. A pre-clearance result is not used as a basis for settlement but is disclosed to the market players. Under the pre-clearance mechanism, parties participating in market transactions may understand the market's demand and supply conditions in advance, enabling them to formulate more reasonable trading plans and strategies.

The clearing result refers to the price in the electricity market when supply and demand are balanced. In some embodiments, the demand forecasting sub-module may provide real-time quotes to power producers based on a prediction result of the demand prediction model, and match needs of buyers and sellers to determine a transaction volume and a clearing price, i.e., the clearing result.

The edge-side flexible resource refers to a decentralized smart device capable of producing flexible resources, such as a small solar panel, a storage device, etc.

The day-ahead data of the edge-side flexible resource refers to monitoring data of smart device from the previous day. The day-ahead data may include a power demand or output of the smart device, a total power demand of the industrial park, a price in the electricity market, etc.

By way of example, in an industrial park with one VPP, the VPP consists of a plurality of energy production devices (e.g., wind turbines, solar panels, gas generators, etc.) and energy consumption devices (e.g., factory equipment, office equipment, etc.). Each smart device is equipped with a sensor that may monitor the operational status and power demand or output of the smart device in real-time. In some embodiments, the demand forecasting sub-module may collect the day-ahead data and use machine learning and artificial intelligence techniques to construct the demand prediction model based on the day-ahead data.

The demand prediction model is used to predict the power demand of the industrial park and the power demand or output of each device over a future period (e.g., the next day). In some embodiments, the demand prediction model may be a machine learning model. For example, the demand prediction model may be a neural network model (NN), a deep neural network model (DNN), or any combination thereof. In some embodiments, an input of the demand prediction model may include the day-ahead data of the smart device, and an output of the demand prediction model may include the power demand or output of the smart device over a future period.

In some embodiments, the demand prediction model may be trained using a large number of first training samples with first labels. The first training samples may be historical day-ahead data of sample devices, and the first labels may be the actual power demand or output of the sample devices for the future period corresponding to the historical day-ahead data. The first labels may be automatically annotated by the system based on a historical record.

In some embodiments, the demand forecasting sub-module may input a large number of first training samples into an initial demand prediction model. Based on an output of the initial demand prediction model and labels representing the actual power demand or output of the sample devices for the future period corresponding to the historical day-ahead data, a loss function is constructed. The initial demand prediction model is iteratively updated based on the loss function. The training is completed when a value of the loss function meets an iteration completion condition. The iteration completion condition may include the loss function converging, a count of iterations reaching a threshold, etc.

In some embodiments, the VPP, acting as a price taker, participates in the electricity spot market transactions. In the electricity spot market, the VPP may make real-time bids with the power producer based on the prediction result of the demand prediction model and market prices. For example, if the demand prediction model predicts that the power demand in the industrial park will increase in the next hour and the electricity spot market price is low, the VPP may choose to increase an amount of electricity purchased and offer a slightly higher price than the spot market price. When the bids from buyers and sellers balance the supply and demand, the clearing result is determined.

In some embodiments, the VPP may release the clearing result to the market players in real-time. The market players refer to entities participating in the electricity spot market transactions, such as power producers, electricity market operators, industrial park managers, etc. In some embodiments, the market players may use the clearing result to understand the VPP's power demand and supply situation, and the electricity spot market price, thereby making corresponding decisions. For example, if the spot market price is lower than a certain market operator's expected price, the operator may increase a purchase volume based on an expected purchase amount.

In some embodiments, through the above described manner, the demand forecasting sub-module facilitates the VPP to achieve rapid response to power demand, optimize resource allocation, reduce power costs, and improve the stability and efficiency of power supply.

The resource aggregation sub-module is configured to coordinate a VPP multi aggregator entity with the market players. In some embodiments, the resource aggregation sub-module may divide the VPP into resource aggregation layers from top to bottom according to a capacity scale of a trading entity and a market agency form. The resource aggregation sub-module is configured to coordinate interactions between the VPP multi aggregator entity and the market players to ensure stable energy supply.

The VPP multi aggregator entity refers to an entity consists of a plurality of aggregators participating in the VPP's power transactions.

In some embodiments, a VPP may consist of a plurality of energy production devices (e.g., wind turbines, solar panels, gas generators, etc.) and energy consumption devices (e.g., factory equipment, office equipment, etc.). These devices may be owned and operated by different aggregators (e.g., equipment manufacturers, energy suppliers, etc.).

The market agency form refers to a form of a market agency for the VPP's electricity sales. For example, the market agency form may include a self-operated VPP, a third-party operated VPP, etc.

In some embodiments, the resource aggregation sub-module may divide the VPP into resource aggregation layers from top to bottom based on the capacity scale of the trading entity and the market agency form.

For example, the resource aggregation sub-module may divide the VPP into the resource aggregation layers based on the capacity scale of the VPP, such as dividing the VPP into a VPP of an industrial park, a VPP of a regional grid, a VPP of a provincial grid, etc.

As another example, the resource aggregation sub-module may divide the VPP into the resource aggregation layers based on the market agency form of the VPP. According to different operation modes and market roles, the VPP may be classified into corresponding resource aggregation layers.

Within the resource aggregation layers, the resource aggregation sub-module may allocate each device to a different aggregator based on the capacity scale of the trading entity and the market agency form. For example, a large-capacity device (e.g., a large wind turbine) may be allocated to a large aggregator, while a small-capacity device (e.g., a small solar panel) may be allocated to a small aggregator. In some embodiments, the resource aggregation sub-module also considers the market agency form, such as requiring devices that utilize renewable resources like wind turbines and solar panels to be traded through market agents holding green power certificates.

In some embodiments, the resource aggregation sub-module may coordinate interactions between the VPP multi aggregator entity and the market players. For example, the resource aggregation sub-module may facilitate transactions between aggregators and the electricity market. When certain aggregators need to buy or sell electricity, they may do so through the resource aggregation sub-module to interact with the electricity market, thereby ensuring a stable energy supply.

In some embodiments, the resource aggregation sub-module may also coordinate interactions between aggregators and equipment manufacturers, including purchase and maintenance of equipment to ensure normal operation. For example, when an aggregator needs to add wind turbines, the aggregator may negotiate and procure appropriate equipment through the resource aggregation sub-module with wind turbine manufacturers.

In some embodiments of the present disclosure, by coordinating the interactions between the VPP multi aggregator entity and the market players, the resource aggregation sub-module can help the VPP achieve effective resource aggregation, optimize resource allocation, reduce transaction costs, and improve the stability and efficiency of energy supply.

The distributed resource sub-module is configured to coordinate an edge-side flexible resource entity with an industrial park operator. Within a structure of the VPP, the distributed resource sub-module is responsible for coordinating interactions between the edge-side flexible resource entity and the industrial park operator.

The edge-side flexible resource entity refers to an owner or controller of the edge-side flexible resource. The industrial park operator refers to an entity responsible for managing and operating the industrial park.

A demand response transaction refers to request data related to demand response. In some embodiments, the demand response transaction may include power demand data. The power demand data refers to information related to required power, such as an amount of electricity needed, time period, location, energy type, etc.

A consumer initiates the demand response transaction by providing power demand data to aggregators. The aggregators may collect the power demand data from the consumer and collaborate with the industrial park operator to ensure a stable energy supply. The aggregators may form agreements based on the demand information from both suppliers and consumers to ensure that a delivery time of the supplier's power may meet the consumer's needs. For example, after a consumer sends the demand response transaction, the industrial park operator may adjust a power usage time and use an energy-saving device according to the set agreement to reduce peak power consumption and respond to adjustments of a demand side.

In some embodiments, the optimal allocation module may also include a first demand forecasting sub-module, a first resource aggregation sub-module, and a first distributed resource sub-module.

The first demand forecasting sub-module is configured to manage demand response and resource allocation transactions under the regulation of the industrial park virtual power plant.

In some embodiments, the first demand forecasting sub-module may collect, analyze, and count specification parameters of flexible resources, classify and visually model the flexible resources, establish a linear correlation function and/or a non-linear correlation function of each type of the flexible resources, extract a key index of each type of the flexible resources, and establish a time, space, and energy based demand response model corresponding to the industrial park for different demand scenarios according to time periods and capacities of past participation of the industrial park in grid demand response.

An industrial park virtual power plant may have various types of flexible resources, including wind turbines, solar panels, gas generators, battery storage equipment, factory equipment, etc.

The specification parameters refer to relevant parameters that reflect specifications of flexible resources. In some embodiments, different flexible resources have different specification parameters. For example, the specification parameters of a wind turbine may include a maximum output power, the specification parameters of a solar panel may include a maximum photovoltaic conversion efficiency, and the specification parameters of a gas generator may include a maximum gas consumption rate.

In some embodiments, the first demand forecasting sub-module may collect the specification parameters of flexible resources. For example, the first demand forecasting sub-module may acquire the specification parameters through data exchange via an Internet of Things (IoT) interface of a device or via a data exchange interface of a database of a device manufacturer.

In some embodiments, the first demand forecasting sub-module may classify and define various types of flexible resources. For example, the first demand forecasting sub-module may categorize wind turbines and solar panels as renewable energy resources, gas generators as traditional energy resources, battery storage equipment as storage resources, and factory equipment as load resources.

In some embodiments, the first demand forecasting sub-module may establish a visual model for each type of flexible resources. For example, taking renewable energy resources as an example, the first demand forecasting sub-module may, based on relevant data such as the count of devices and device specifications of renewable energy resources like wind turbines and solar panels, use visualization techniques such as bar charts, radar charts, etc., to construct a model that intuitively depicts the composition of this type of flexible resources.

In some embodiments, the first demand forecasting sub-module may analyze and statistically evaluate the specification parameters of various types of flexible resources in the virtual power plant to determine a key index. For example, the first demand forecasting sub-module may determine an average specification parameter of the various types of flexible resources as the key index, or determine maximum and minimum values of the specification parameters as the key index. The key index may help the virtual power plant better understand performance characteristics of its flexible resources.

In some embodiments, the first demand forecasting sub-module may establish a correlation function for each type of the flexible resources. For example, the first demand forecasting sub-module may establish a correlation function for wind turbines to represent a relationship between the output power of wind turbines and wind speed. As another example, the first demand forecasting sub-module may establish a correlation function for solar panels to represent a relationship between the output power of solar panels and solar radiation intensity. The correlation function may be linear and/or nonlinear and may be determined based on actual conditions. The correlation function may be used for predicting an output capacity of the flexible resources in the virtual power plant.

In some embodiments, the first demand forecasting sub-module may establish a demand response model for the industrial park based on time periods and capacities of past participation of the industrial park in grid demand response.

The demand response model is used to determine electricity demands corresponding to different time periods, spaces, and energy sources. In some embodiments, the demand response model may be a machine learning model. For example, the demand response model may be a neural network model, a deep neural network model, or the like, or any combination thereof. An input of the demand response model may include a time period, a space, and an energy source, and an output of the demand response model may include the electricity demand corresponding to the time period, the space, and the energy source.

The flexible resources include electricity resources from different regions, with different regions corresponding to different spaces. A blockchain may integrate resources belonging to a same region and generate a corresponding credential, facilitating matching of appropriate flexible resources based on the electricity demand in different spaces. Energy refers to the type of energy needed. Energy may be divided into wind power, hydroelectric power, solar power, etc. Energy may also be roughly divided into renewable energy and non-renewable energy.

In some embodiments, the demand response model may be trained based on a large number of second training samples with second labels. The second training samples may include sample time periods and sample capacities from historical records, and the second labels may be historical actual electricity demands corresponding to the sample time periods, sample spaces, and sample energy sources. The second labels may be automatically annotated by the system based on historical records.

The training manner of the demand response model is similar to that of the demand prediction model, as described above.

In some embodiments, the first demand forecasting sub-module, by establishing the visual model, the correlation function, and the demand response model, may help the virtual power plant predict the output capacity of the flexible resources and forecast the electricity demand of the industrial park, thereby better adjusting the configuration and operation of device resources.

The first resource aggregation sub-module is configured to determine a count of aggregators participating in flexible resource optimal allocation and parameters such as a response time, a response capacity, a response rate, and a priority of each type of flexible resource of each aggregator in a process of participating in a distributed transaction.

The first resource aggregation sub-module may coordinate power outputs and/or power consumptions of different units, distributed power sources, and other power-using devices (e.g., a personal terminal, a console, etc.), and perform coordinated operation and capacity optimization with a device connected to a microgrid of the industrial park. For example, the first resource aggregation sub-module may choose to operate a power-using device during a low-price period and optimize capacity utilization, such as using a smart electricity meter for intelligent optimization of a process of integrating various flexible resource capacities in the industrial park. The smart electricity meter may upload relevant data to the system for blockchain-based virtual power plant management in real time by monitoring the operation of devices, enabling the industrial park to aggregate flexible resources.

In some embodiments, the first resource aggregation sub-module may determine the count of aggregators participating in flexible resource optimal allocation. In some embodiments, the first resource aggregation sub-module may determine the count of aggregators participating in flexible resource optimal allocation by analyzing factors such as the electricity demand of the industrial park, the specification parameters of flexible resources, and transaction rules of an electricity market.

For example, based on the specification parameters of the flexible resources, if the first resource aggregation sub-module determines that up to 5 aggregators may meet the electricity demand of the industrial park, the first resource aggregation sub-module may set the count of aggregators participating in the flexible resource optimal allocation to 5. As another example, if the transaction rules of the electricity market stipulate that the count of aggregators should not exceed 4, the first resource aggregation sub-module may set the count of aggregators participating in the flexible resource optimal allocation to be below 4.

The transaction rules of the electricity market refer to rules that traders participating in electricity market transactions must follow. For example, the transaction rules may include limits on the count of aggregators participating, provisions on electricity prices at different time periods, etc.

In some embodiments, the first resource aggregation sub-module may determine parameters such as the response time, response capacity, and response rate of each type of flexible resource for each aggregator. For example, based on factors such as the maximum output power of wind turbines, the maximum photovoltaic conversion efficiency of solar panels, the maximum gas consumption rate of gas turbines, the electricity demand of the industrial park, and the transaction rules of the electricity market, the first resource aggregation sub-module may determine the response time, response capacity, and response rate of wind turbines, solar panels, and gas turbines.

The response time refers to the time required for a flexible resource to provide a required amount of electricity from the moment it receives a demand signal. The response capacity is a maximum amount of electricity that a flexible resource may provide within a certain period of time. The response rate is a fastest rate at which a flexible resource may respond to changes in demand.

By way of example, for a wind turbine, the response time may be determined based on a speed of wind changes. Typically, the response time of the wind turbine may be shorter if the wind speed is relatively high. The response capacity may be determined by the maximum output power of the wind turbine and the wind speed, for example, the higher the maximum output power and the faster the wind speed is, the higher the response capacity is. The response rate may be determined based on a startup time and a speed at which a resource becomes operational. Devices using renewable energy resources such as wind turbines and solar panels typically have a faster response rate, while traditional power generation devices such as gas turbines may have a slower response rate.

In some embodiments, the first resource aggregation sub-module may determine the priority of each type of flexible resource based on the above parameters. For example, based on the response time, response capacity, and response rate, the first resource aggregation sub-module may set the priority of each type of flexible resource according to a preset rule. The preset rule may prioritize the use of renewable resources with shorter response times and/or larger response capacities and/or faster response rates. For example, preset rule may prioritize the use of wind turbines with larger response capacities, followed by solar panels with lower response capacities, and then gas turbines.

In some embodiments, the first resource aggregation sub-module may coordinate power outputs and/or power consumptions of different units, distributed power sources, and other power-using devices. For example, based on the electricity demand of the industrial park and the transaction rules of the electricity market, the first resource aggregation sub-module may adjust the power outputs of wind turbines, solar panels, and gas turbines, as well as the power consumptions of factory equipment, to ensure a balance between the electricity supply and demand of the virtual power plant.

By way of example, when the electricity demand of the industrial park exceeds the power output of renewable energy sources, the first resource aggregation sub-module may increase the power output of gas turbines. During peak electricity price periods, the first resource aggregation sub-module may reduce the power consumption of power-using devices to minimize cost. During off-peak periods, the first resource aggregation sub-module may increase the power consumption take advantage of low-cost electricity.

In some embodiments, the first resource aggregation sub-module may adjust the device connected to the microgrid of the park, enabling coordinated operation and optimizing the capacity of the VPP. For example, based on the electricity demand of the industrial park, the transaction rules of the electricity market, and the power output of wind turbines, solar panels, and gas turbines, the first resource aggregation sub-module may adjust charging and discharging power of a battery energy storage device to optimize a total capacity of the VPP.

By way of example, when the power output of wind turbines, solar panels, and gas turbines is insufficient to meet the electricity demand, the first resource aggregation sub-module may compensate for the energy gap by increasing the discharging power of the battery energy storage system. During periods of low electricity prices, the first resource aggregation sub-module may increase the charging power of the battery energy storage device to store surplus electricity. During periods of high electricity prices, the first resource aggregation sub-module may increase the discharging power of the battery energy storage device to release stored energy.

In some embodiments of this disclosure, by adjusting the charging and discharging power of the battery energy storage device through the first resource aggregation sub-module, more electricity may be stored during off-peak periods and released during peak periods to smooth out electricity demand, which may reduce reliance on traditional power generation equipment, optimize total capacity, ensure the virtual power plant consistently meets the electricity demand of the industrial park, and optimize the configuration and operation of device resources.

The first distributed resource sub-module is configured to obtain an aggregation allocation attribution and a demand response time slot of each type of the flexible resources by performing flexible resource optimization solving, determine an actual response demand on a grid side according to an actual operation situation within a day, and sequentially call the aggregators under different demand scenarios according to the priority of the flexible resources until a user demand is satisfied. In this process, the virtual power plant conducts flexible resource optimization solving based on the demand response constructed above, with the assistance of auxiliary services such as frequency regulation, peak shaving, voltage regulation, standby, and congestion elimination, to meet the user demand.

The aggregation allocation attribution refers to how flexible resources are allocated to aggregators during a demand response period. The demand response period is the time period in which aggregators respond to electricity demand. The flexible resource optimization solving refers to the process of solving an optimization model described later. More descriptions of solving the optimization model may be found in the related descriptions below.

Suppose there is a virtual power plant consisting of three aggregators A, B, and C, each with their own device resources including wind turbines, solar panels, gas turbines, battery energy storage device, factory equipment, etc. The electricity demand of the industrial park varies with time, requiring different electricity needs to be met at different time periods.

In some embodiments, the first distributed resource sub-module may perform flexible resource optimization solving. In some embodiments, the flexible resource optimization solving may include using an optimization algorithm (e.g., linear programming, nonlinear programming, dynamic programming, etc.) to determine the aggregation allocation attribution and the demand response time slot of each type of the flexible resources.

For example, since wind and solar power generation capacities are stronger during the daytime, the first distributed resource sub-module may allocate wind turbines of aggregator A and solar panels of aggregator B to the industrial park from 8 a.m. to 10 a.m., while allocating gas turbines of aggregator C and battery energy storage devices of aggregator A to the industrial park from 6 p.m. to 8 p.m. to meet the electricity demand of the industrial park.

In some embodiments, the first distributed resource sub-module may determine the actual response demand on the grid side according to the actual operation situation within a day. For example, if the electricity demand of the industrial park from 6 p.m. to 8 p.m. is greater than expected, the first distributed resource sub-module may appropriately increase the power generation capacity of the gas turbines of aggregator C to meet the actual electricity demand of the industrial park.

In some embodiments, the first distributed resource sub-module may sequentially call the aggregators under different demand scenarios according to the priority of the flexible resources until the user demand is satisfied. For example, the first distributed resource sub-module may first call the wind turbines of aggregator A and the solar panels of aggregator B. If the above device resources cannot meet the electricity demand of the industrial park, the first distributed resource sub-module may continue to call the gas turbines of aggregator C and the battery energy storage devices of aggregator A.

In some embodiments, the first distributed resource sub-module may satisfy the user demand through frequency regulation, peak shaving, voltage regulation, standby, congestion elimination, and other auxiliary services, combined with flexible resource optimization solving based on the demand response constructed above.

For example, the first distributed resource sub-module may use the frequency regulation to adjust a power generation frequency of device resources, use the peak shaving to adjust the power generation capacity of device resources, use the voltage regulation to adjust the power generation voltage of device resources, use the standby to reserve device resources, and use the congestion elimination to eliminate grid congestion.

In some embodiments of the present disclosure, by determining the aggregation allocation and the demand response time slot of the flexible resources through the first distributed resource sub-module, better optimization of the configuration and operation of the flexible resources can be achieved to meet the electricity demand of the industrial park.

In some embodiments, the optimal allocation module may further include an optimization model, which may include decision variables, an objective function, and constraints.

In some embodiments, the decision variables may include the aggregation allocation attribution for the demand response time slot of each of the aggregators. The aggregation allocation attribution may be set as $M_{m,t}^a$, $N_{m,t}^a$, wherein $M_{m,t}^a$ denotes a state variable with a value between 0 and 1, representing a start response time slot of a flexible resource m and an aggregation allocation attribution of an aggregator a at the start response time slot. If the flexible resource m starts responding at a time slot t and is assigned to the aggregator a at the same time, $M_{m,t}^a=1$, otherwise $M_{m,t}^a=0$. $N_{m,t}^a$ is a state variable with a value between 0 and 1, representing a current response time slot of the flexible resource m and an aggregation allocation attribution of the aggregator a in the current response time slot. If the flexible resource m has responded at the time slot t and is assigned to the aggregator a, $N_{m,t}^a=1$, otherwise $N_{m,t}^a=0$, wherein $m \in M$, $t \in T$, and $a \in A$, M denotes a collection of the flexible resources, T denotes a collection of the demand response time slots, and A denotes a collection of the aggregators.

The objective function is a function for determining a minimum value of a unit aggregator's cost of a current demand response, the objective function being set as $f(a) = \min \Sigma_{t \in T} \Sigma_{m \in M} \Sigma_{a \in A} w_a c_m p_m N_{m,t}^a$, wherein $w_a$ denotes a weight of the aggregator a as a percentage of an aggregator aggregation, $c_m$ denotes a cost per unit of capacity consumed by the flexible resource m within the current demand response, and $p_m$ denotes a capacity of the flexible resource m within the current demand response.

The current response time slot refers to the period in which the current demand response is occurring. The cost per unit of capacity consumed refers to the cost incurred when using one unit of capacity of a flexible resource to accommodate one unit of electricity demand or load. In some embodiments, the optimal allocation module may determine the cost by obtaining historical data of a smart device related to the flexible resource.

In some embodiments, the capacity of a flexible resource under the current demand response may be determined based on the flexible resource's classification, specification, and key index. For example, if the flexible resource m is a wind turbine, which belongs to renewable energy resources and its power generation efficiency is easily affected by natural conditions, with a maximum working capacity of 2.5 MW, the optimal allocation module may determine the capacity $p_m$ of the flexible resource m under the current demand response based on the wind speed at the current moment or in a future time period. An adjustable capacity range may be between 0 and 2.5 MW.

In some embodiments, for each of the aggregators, the optimal allocation module may determine an initial demand response cost of the aggregator for each combination of time period t and flexible resource m using the objective function. By applying a weight $w_a$, which represents the contribution of the aggregator within the multi aggregator entity, the initial demand response cost is adjusted to determine the demand response cost for the aggregator. The aggregator with the lowest demand response cost under the current demand, meaning the aggregator with the lowest transaction price, is then selected as the aggregator to respond to the current demand.

In some embodiments, the constraints may include:

(1). An aggregation allocation limitation of the start response time slot and the current response time slot for the flexible resource m, the aggregated allocation limitation being set as $$\begin{cases} N_{m,t}^a \geq M_{m,t}^a \\ N_{m,t}^a - N_{m,t-1}^a \leq M_{m,t}^a \end{cases}.$$

(2). A limitation for a count of aggregated allocations and dispatches for the flexible resource m, the limitation for the count of aggregated allocations and dispatches being set as $\Sigma_{t \in T} \Sigma_{a \in A} M_{m,t}^a \leq 1$ (3). A maximum response duration limitation for the flexible resource m, the maximum response duration limitation being set as $\Sigma_{a \in A} \Sigma_{t \in T} N_{m,t}^a \leq T_m^{max}$, wherein $T_m^{max}$ is a maximum response duration of the flexible resource m.

(4). Guaranteeing that flexible resources having a backward and forward coupling relationship are associated, i.e., ensuring the configuration and accommodation of flexible resources with the backward and forward coupling relationship. When considering the configuration of flexible resources with the backward and forward coupling relationship, mutual influences and dependencies between the flexible resources need to be comprehensively considered. For example, if a set of flexible resources includes both solar panels and energy storage devices, the coordination between charging and discharging needs to be considered to fully utilize solar power generation and release stored energy when needed.

(5). A minimum response capacity limitation for the aggregator a, the minimum response capacity limitation being set as $\Sigma_{m \in M} N_{m,t}^a P_m \gamma m \geq P_D^a$, wherein $P_m$ denotes a response capacity of the flexible resource m, $P_D^a$ denotes a minimum response capacity required after aggregation of flexible resources of the aggregator a, and $\gamma_m$ denotes a confidence factor for timely response corresponding to the flexible resource m.

(6). A minimum response speed limitation and a minimum recovery speed limitation required after the aggregation of the flexible resources of the aggregator a, the minimum response speed limitation and the minimum recovery speed limitation being set as $$\begin{cases} \sum_{m \in M} N_{m,t}^a h_m^M \geq H_M^a, \\ \sum_{m \in M} N_{m,t}^a h_m^D \geq H_D^a, \end{cases}$$

wherein $h_m^M$ and $h_m^D$ denote a response speed and a recovery speed of the flexible resource m, respectively, and $H_M^a$ and $H_D^a$ denote an overall minimum response speed and a minimum recovery speed of the aggregator a, respectively.

In some embodiments, through the optimization model, the efficiency of determining aggregators can be improved, which enables the selection of more reasonable aggregators to better and more timely respond to current electricity demands, thereby achieving rapid demand response and flexible resource optimal allocation.

In some embodiments, the blockchain-based data collaboration module 102 is a module configured to establish a data sharing and transaction environment. In some embodiments, the blockchain-based data collaboration module 102 may be configured to establish a data sharing and transaction environment among various participants of a virtual power plant based on an output of the optimal allocation module.

In some implementations, the blockchain-based data collaboration module 102 may include a demand response transaction processing sub-module and a cooperative agreement reaching sub-module.

The demand response transaction processing sub-module is configured to process demand response transactions initiated by consumers, which involves consumers providing electricity demand data to electricity aggregators. In some embodiments, the electricity demand data may include the consumer's electricity usage history, expected electricity demand, time periods of electricity usage, etc.

In some embodiments, aggregators may collect the electricity demand data and cooperate with grid operators based on the electricity demand data. For example, if the electricity demand data shows a high expected demand for a certain time period, the demand response transaction processing sub-module may enhance a supply capacity by adjusting an electricity supply plan and optimizing an electricity distribution strategy to ensure stability of energy supply.

In some embodiments, the demand response transaction processing sub-module, through data collection and integration, coordinates with the grid operators to optimize the electricity supply plan or the electricity distribution strategy, thereby meeting consumers' electricity demands while maintaining stable operation of the grid.

In some embodiments, the cooperative agreement reaching sub-module may be configured to reach a cooperative agreement based on demand information from both supply and demand sides, which involves analyzing the demand information of both supply and demand sides, including consumers' electricity demands, electricity supply capabilities of electricity suppliers, etc., and formulating the cooperative agreement based on the demand information using templates. The cooperative agreement may include a time of electricity supply, an amount of electricity supply, an electricity price, etc. The cooperative agreement reaching sub-module, through the cooperative agreement, aims to ensure that the delivery time of suppliers' electricity can meet consumers' needs as much as possible, thus achieving efficient operation of the electricity market.

In some embodiments, the visualization management module 103 may include a demand-side response adjustment sub-module, which may adjust a demand side response by shifting electricity usage times, using energy-saving devices, etc., according to the set cooperative agreement after consumers send demand response transactions, thereby reducing electricity peaks. The process begins with consumers sending demand response transactions, which may include information such as consumers' electricity demands and expected electricity usage times.

In some embodiments, the demand-side response adjustment sub-module may recommend consumers to adjust their electricity usage time, use energy-saving devices, and other strategies to reduce electricity peaks based on the set cooperative agreement. For example, the demand-side response adjustment sub-module may recommend consumers to use electricity during periods of lower electricity demand or suggest the use of energy-saving devices to reduce electricity consumption.

In some embodiments of the present disclosure, the demand-side response adjustment sub-module can achieve balance and stability of a power system through effective demand-side management while meeting consumers' electricity demands.

In some embodiments, the blockchain-based data coordination module 102 may include a communication network construction sub-module, a transaction processing sub-module, and a smart contract sub-module.

In some embodiments, the communication network construction sub-module may be configured to construct a communication network for the aggregators and edge-side users based on a blockchain peer-to-peer mechanism. In the process of constructing the communication network, each participant is assigned a user identity permission specified and verified through a certificate mechanism. The certificate mechanism is a security protocol that ensures the trustworthiness of each participant in the communication network, thereby preventing malicious user intrusion. In the communication network, each participant may communicate directly with any other participant without the need for a central node, i.e., the aforementioned peer-to-peer mechanism. The peer-to-peer mechanism may significantly improve communication efficiency and enhance network robustness. Even if some nodes fail, it may not affect the operation of the entire network.

The edge-side users refer to users of the system for blockchain-based virtual power plant management corresponding to the entities of flexible resources on an edge side.

In some embodiments, the transaction processing sub-module may be configured to perform a structured data processing on the flexible resources and implement off-chain transactions for the flexible resources. During the transaction process, all transaction information may be recorded and uploaded to the blockchain as a relevant credential. Due to the characteristics of blockchain, once data is written, it is almost impossible to tamper with, ensuring transparency and traceability of transactions. Both the aggregators and the edge-side users may understand detailed information of each transaction, including the time of the transaction, the parties involved in the transaction, and the content of the transaction, by viewing the data on the blockchain.

In some embodiments of the present disclosure, a secure and transparent data sharing and transaction environment may be established among the various participants of the virtual power plant using blockchain technology. The data sharing and transaction environment enables rapid delivery of demand response, thereby improving the efficiency of power transactions.

In some embodiments, the smart contract sub-module may be configured to write an event-driven based flexible resource allocation mechanism into a smart contract. The smart contract is an automatically executed program that may automatically perform a predefined operation when a certain condition is met. In the smart contract sub-module, the smart contract is not only used to implement flexible resource allocation but also provides at least a querying function, a flexible resource tracing function, a penalty for a breach event function, and a compensation for a breached event function.

In some embodiments of the present disclosure, the above functions are automatically completed through the smart contract without manual intervention, greatly improving efficiency. Additionally, since an execution result of the smart contract is also written into the blockchain, all operations are transparent and may be viewed by anyone, ensuring the credibility of the system.

The visualization management module 103 may be configured to provide a user interface. In some embodiments, the visualization management module 103 may be configured to display, in real time, operational status and power transactions of the virtual power plant in the user interface based on the output of the event-driven based demand rapid response and flexible resource optimal allocation module and an output of the blockchain-based data collaboration module.

The user interface refers to the interface used to display relevant information about the virtual power plant to a user.

In some embodiments, the visualization management module 103 may include a business layer sub-module and an API Service layer sub-module.

The business layer sub-module may be configured to construct a core event processor based on a blockchain and a smart contract in an event-oriented business layer and implement an event processing process driven by the smart contract.

In some embodiments, the business layer sub-module may construct a core event processor based on a blockchain and a smart contract in an event-oriented business layer and implement an event processing process driven by the smart contract.

The core event processor refers to an event processor driven by the smart contract described above in the description of the edge layer.

The blockchain provides a distributed, decentralized data storage and processing platform that ensures data security and consistency. The smart contract, on the other hand, is an automatically executed program that may be written and executed on the blockchain to process various complex business logics. By combining the blockchain and the smart contract, the business layer sub-module can realize the event-driven processing process driven by the smart contract, which can automatically process various business events, such as transaction confirmation, data updates, etc., thereby greatly improving the efficiency and accuracy of business processing.

The API Service layer sub-module is configured to provide an interactive interface for different users in a user-oriented API Service layer, wherein the user-oriented API Service layer may include basic functions such as a permission control function, an event registration function, a service discovery function, or the like. As the API Service layer are decoupled with the event-driven business layer, i.e., the business logic and data flow between the API Service layer are decoupled and the event-driven business layer are independent, more precise visualization processing can be achieved based on user preference data.

The user-oriented API Service layer is a business logic layer that provides the interactive interface and related service functions for users. The user preference data refers to data that reflects the preferences of users when using the system for blockchain-based virtual power plant management. For example, the user preference data may include users' historical usage habits, preference settings, or the like.

In some embodiments, the API Service layer sub-module may provide the interactive interface for different users in the user-oriented API Service layer. In some embodiments, the user-oriented API Service layer may include basic functions such as a permission control function, an event registration function, a service discovery function, or the like.

The permission control function ensures that only users with appropriate permissions may access and operate specific data and services. The event registration function allows users to register for events of interest, and the system for blockchain-based virtual power plant management may automatically notify users when the events of interest occur. The service discovery function helps users discover and use various services, such as data visualization, etc., provided by the system for blockchain-based virtual power plant management.

As the API Service layer are decoupled with the event-driven business layer, the API Service layer sub-module may perform more precise visualization processing based on user preference data. For example, the API Service layer sub-module may provide a personalized interface layout and feature settings based on a user' historical usage habits and preference settings, thereby improving user experience.

In some embodiments of the present disclosure, the visualization management module provides a user-friendly user interface, allowing users to conveniently view and manage the operational status and power transaction situation of the virtual power plant, thereby enabling users to better understand and control power transaction, ultimately enhancing user satisfaction.

It should be noted that the descriptions of the blockchain-based system for blockchain-based virtual power plant management and its modules provided above are for convenience and should not limit the scope of the present disclosure to the embodiments provided. It is understood that for a person of ordinary skills in the art, after understanding the principles of the system, various combinations of modules or connections with other modules may be made without departing from these principles. In some embodiments, the event-driven based demand rapid response and flexible resource optimal allocation module 101, the blockchain-based data collaboration module 102, and the visualization management module 103 disclosed in FIG. 1 may be different modules within a system or a single module implementing the functions of two or more of the above modules. For example, the modules may share a storage module, or each module may have its own storage module. Such variations are within the scope of the present disclosure.

In the above embodiments, the system for blockchain-based virtual power plant management is provided. Correspondingly, some embodiments of the present disclosure also provide a method for blockchain-based virtual power plant management.

Figure 2:
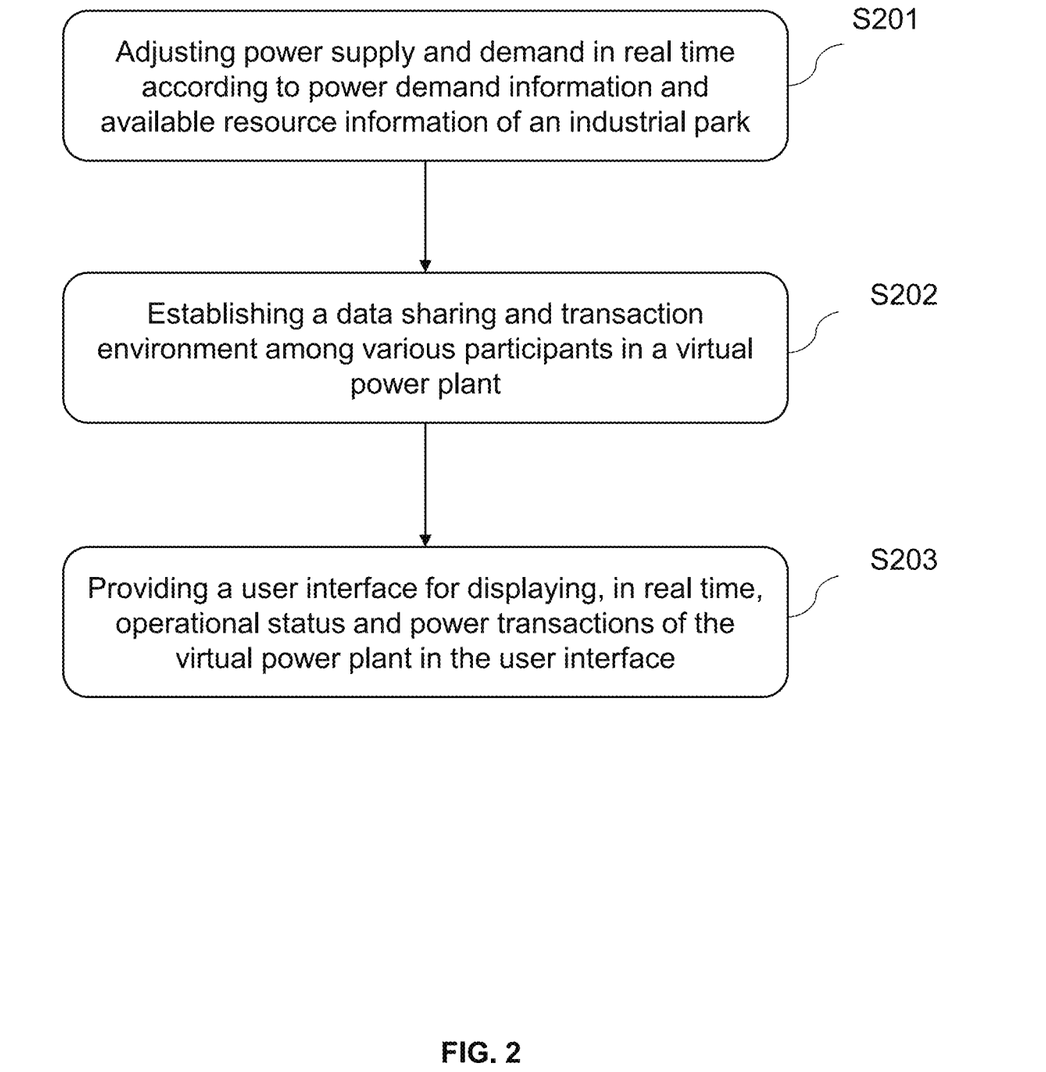
FIG. 2 is a flowchart illustrating an exemplary process of blockchain-based virtual power plant management according to some embodiments of the present disclosure.

FIG. 2 is a flowchart illustrating an exemplary process of blockchain-based virtual power plant management according to some embodiments of the present disclosure. The process may be executed based on the aforementioned system for blockchain-based virtual power plant management and may include the following operations:

In S201, power supply and demand may be adjusted in real time according to power demand information and available resource information of an industrial park.

More descriptions of the power demand information and available resource information may be found in the relevant descriptions of the optimal allocation module 101 in FIG. 1.

Operation S201 involves real-time monitoring of the power supply and demand, and predicting and adjusting the power supply and demand. For example, operation S201 may include dynamically adjusting a power supply plan based on changes in actual power demand and available resources, and dynamically adjusting power purchasing and selling strategies based on changes in electricity market prices.

In some embodiments, operation S201 may include: after determining aggregators and flexible resources corresponding to different demand scenarios through an optimization model, implementing a flexible resource optimal allocation under the different demand scenarios. The optimization model may include decision variables, an objective function, and constraints.

In some embodiments, the decision variables may include an aggregation allocation attribution at a demand response time slot of each of the aggregators. The aggregation allocation attribution may be set as $M_{m,t}^a$, $N_{m,t}^a$ t, wherein $M_{m,t}^a$ denotes a state variable with a value between 0 and 1, representing a start response time slot of a flexible resource m and an aggregation allocation attribution of an aggregator a at the start response time slot. If the flexible resource m starts responding at a time slot t and is assigned to the aggregator a at the same time, $M_{m,t}^a=1$, otherwise $M_{m,t}^a=0$. $N_{m,t}^a$ is a state variable with a value between 0 and 1, representing a current response time slot of the flexible resource m and an aggregation allocation attribution of the aggregator a in the current response time slot. If the flexible resource m has responded at the time slot t and is assigned to the aggregator a, $N_{m,t}^a=1$, otherwise $N_{m,t}^a=0$, wherein m∈ M, t∈ T, and a∈ A, M denotes a collection of the flexible resources, T denotes a collection of the demand response time slots, and A denotes a collection of the aggregators;

The objective function is a function for determining a minimum value of a unit aggregator's cost of a current demand response. The objective function may be set as $f(a)=\min \Sigma_{t\in T} \Sigma_{m\in M} \Sigma_{a\in A} w_a c_m p_m N_{m,t}^a$, wherein $w_a$ denotes a weight of the aggregator a as a percentage of an aggregator aggregation, $c_m$ denotes a cost per unit of capacity consumed by the flexible resource m within the current demand response, and $p_m$ denotes a capacity of the flexible resource m within the current demand response.

In some embodiments, the constraints may include:

(1). An aggregation allocation limitation of the start response time slot and the current response time slot for the flexible resource m, the aggregated allocation limitation being set as $$\begin{cases} N_{m,t}^a \geq M_{m,t}^a \\ N_{m,t}^a - N_{m,t-1}^a \leq M_{m,t}^a \end{cases}.$$

(2). A limitation for a count of aggregated allocations and dispatches for the flexible resource m, the limitation for the count of aggregated allocations and dispatches being set as $\Sigma_{t\in T} \Sigma_{a\in A} M_{m,t}^a \leq 1$ (3). A maximum response duration limitation for the flexible resource m, the maximum response duration limitation being set as $\Sigma_{a\in A} \Sigma_{t\in T} N_{m,t}^a \leq T_m^{max}$, wherein $T_m^{max}$ is a maximum response duration of the flexible resource m.

(4). Guaranteeing that flexible resources having a backward and forward coupling relationship are associated.

(5). A minimum response capacity limitation for the aggregator a, the minimum response capacity limitation being set as $\Sigma_{m\in M} N_{m,t}^a P_m \gamma_m \geq P_D^S$, wherein $P_m$ denotes a response capacity of the flexible resource m, $P_D^a$ denotes a minimum response capacity required after aggregation of flexible resources of the aggregator a, and $\gamma_m$ denotes a confidence factor for timely response corresponding to the flexible resource m.

(6). A minimum response speed limitation and a minimum recovery speed limitation required after the aggregation of the flexible resources of the aggregator a, the minimum response speed limitation and the minimum recovery speed limitation being set as $$\begin{cases} \Sigma_{m\in M} N_{m,t}^a h_m^M \geq H_M^a \\ \Sigma_{m\in M} N_{m,t}^a h_m^D \geq H_D^a \end{cases},$$

wherein $h_m^M$ and $h_m^D$ denote a response speed and a recovery speed of the flexible resource m, respectively, and $H_M^a$ and $H_D^a$ denote an overall minimum response speed and a minimum recovery speed of the aggregator a, respectively.

More descriptions of the above constraints may be found in the related descriptions of the optimization model in FIG. 1.

In S202, a data sharing and transaction environment among various participants may be established in a virtual power plant.

Operation S202 involves using blockchain technology to record and validate all power transactions to ensure security and transparency of the power transactions, which may include using a smart contract to automatically execute power transactions and using a distributed ledger of a blockchain to record all power transactions so that all participants may view and verify transaction records.

In some embodiments, operation S202 may include: performing a structured data processing of flexible resources, implementing off-chain transactions for the flexible resources, designating a transaction process as a relevant credential, and uploading the relevant credential to a blockchain, thereby leveraging the nearly immutable nature of blockchain to achieve transaction transparency and traceability.

In some embodiments, the structured data processing of flexible resources may involve collecting and organizing various information about the flexible resources, including but not limited to types, scales, locations, statuses, prices, supply and demand, etc., of the flexible resources. The above information may come from various sources, including but not limited to owners, users, and managers of the flexible resources, various sensors and monitoring devices, or the like. The above information may exist in various formats and structures, thus requiring uniform and standardized processing for effective management and transaction.

In some embodiments, implementing off-chain transactions of flexible resources may involve formulating and executing transaction strategies and rules based on the information of the flexible resources and market demand. The transaction strategies and rules may include but are not limited to resource matching, pricing, allocation, scheduling, settlement, or the like. The off-chain transactions may involve different participants, including but not limited to resource suppliers, demanders, intermediaries, service providers, or the like. The off-chain transactions may involve various contracts and agreements, including but not limited to purchase contracts, lease contracts, service contracts, public-private partnership agreements, or the like.

In some embodiments, designating a transaction process as a relevant credential and uploading the relevant credential to a blockchain may involve encoding and encrypting various information and evidence of the transactions, including but not limited to participants, objects, times, places, prices, conditions, results, etc., of the off-chain transactions into a special data structure, referred to as a blockchain transaction. The off-chain transactions may be organized and linked into a special data structure, referred to as a blockchain. The off-chain transactions may be verified and confirmed as a special data structure, referred to as a block of the blockchain. Blocks of the blockchain may be replicated and distributed to a special network, referred to as a blockchain network.

In some embodiments, leveraging the characteristics of blockchain to achieve transparency and traceability of transactions may involve utilizing properties such as openness, distribution, persistence, security, and intelligence of blockchain to achieve functions such as publicizing, sharing, storing, protecting, and automating transactions. For example, the aforementioned functions may include but are not limited to viewing the history and status of transactions, verifying the authenticity and legality of transactions, tracing the origins and destinations of transactions, resolving transaction disputes, optimizing the efficiency and effectiveness of transactions, or the like.

In S203, a user interface may be provided for displaying, in real time, operational status and power transactions of the virtual power plant in the user interface.

In some embodiments, operation S203 involves developing and providing a user interface so that users may conveniently view the operational status of the virtual power plant, including real-time information on power supply and demand, real-time information on power transactions, and the operational status of power devices. Additionally, the user interface may also provide various management functions so that users may conveniently manage the virtual power plant. The management functions may include adjusting power supply and demand plans, managing power transactions, managing power devices, or the like.

It should be noted that the descriptions of operations S201 to S203 above are merely exemplary and illustrative, and do not limit the scope of the present disclosure. For a person of ordinary skill in the art, various modifications and changes to operations S201 to S203 may be made under the guidance of the present disclosure. However, these modifications and changes remain within the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this disclosure are not necessarily all referring to the same embodiment. Furthermore, the particular features, structures, or characteristics may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device. As another example, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This way of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the present disclosure are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameter set forth in the written description and attached claims are approximations that may vary depending upon the desired properties sought to be obtained by a particular embodiment. In some embodiments, the numerical parameter should be construed in light of the number of reported significant digits and by applying ordinary rounding techniques. Notwithstanding that the numerical ranges and parameter setting forth the broad scope of some embodiments of the present disclosure are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the present disclosure disclosed herein are illustrating of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A system for blockchain-based virtual power plant management, wherein the system comprises:
  an event-driven based demand rapid response and flexible resource optimal allocation module configured to adjust power supply and demand in real time according to power demand information and available resource information of an industrial park;
  a blockchain-based data collaboration module configured to establish a data sharing and transaction environment among various participants of a virtual power plant based on an output of the event-driven based demand rapid response and flexible resource optimal allocation module; and
  a visualization management module configured to provide a user interface for displaying, in real time, operational status and power transactions of the virtual power plant in the user interface based on the output of the event-driven based demand rapid response and flexible resource optimal allocation module and an output of the blockchain-based data collaboration module; wherein
  the event-driven based demand rapid response and flexible resource optimal allocation module further includes:
    a first demand forecasting sub-module configured to:
    collect, analyze, and count specification parameters of flexible resources, classify and visually model the flexible resources, establish a linear correlation function and/or a non-linear correlation function of each type of the flexible resources, extract a key index of each type of the flexible resources, and establish a time, space, and energy based demand response model corresponding to the industrial park for different demand scenarios according to time periods and capacities of past participation of the industrial park in grid demand response;
    a first resource aggregation sub-module configured to determine a count of aggregators participating in flexible resource optimal allocation, coordinate power outputs and/or power consumptions of different units, distributed power sources, and other power-using devices, and perform coordinated operation and capacity optimization in conjunction with a smart electricity meter with a device connected to the industrial park based on a response time, a response capacity, a response rate, and a priority determined based on a preset rule of each type of flexible resources of each aggregator in a process of participating in a distributed transaction; wherein the preset rule is set according to at least one of the response time, the response capacity, and the response rate of the flexible resource; the smart electricity meter is configured to upload relevant data to the system for blockchain-based virtual power plant management in real time by monitoring an operation of the device;
    a first distributed resource sub-module configured to obtain an aggregation allocation attribution and a demand response time slot of each type of the flexible resources by performing flexible resource optimization solving, determine an actual response demand on a grid side according to an actual operation situation within a day, and sequentially call the aggregators under different demand scenarios according to the priority of the flexible resources until a user demand is satisfied;
  the event-driven based demand rapid response and flexible resource optimal allocation module further includes an optimization model, the optimization model including decision variables, an objective function, and constraints, wherein
    the decision variables at least include the aggregation allocation attribution for the demand response time slot of each of the aggregators, the aggregation allocation attribution being set as $M_{m,t}^{a}$, $N_{m,t}^{a}$, wherein $M_{m,t}^{a}$ denotes a state variable with a value between 0 and 1, representing a start response time slot of a flexible resource m and an aggregation allocation attribution of an aggregator a at the start response time slot, if the flexible resource m starts responding at a time slot t and is assigned to the aggregator a at the same time, $M_{m,t}^{a}=1$, otherwise $M_{m,t}^{a}=0$; $N_{m,t}^{a}$ is a state variable with a value between 0 and 1, representing a current response time slot of the flexible resource m and an aggregation allocation attribution of the aggregator a in the current response time slot, if the flexible resource m has responded at the time slot t and is assigned to the aggregator a, $N_{m,t}^{a}=1$, otherwise $N_{m,t}^{a}=0$, wherein $m \in M$, $t \in T$, and $a \in A$, M denotes a collection of the flexible resources, T denotes a collection of the demand response time slots, and A denotes a collection of the aggregators;
    the objective function is a function for determining a minimum value of a unit aggregator's cost of a current demand response, the objective function being set as $f(a) = \Sigma_{t \in T} \Sigma_{m \in M} \Sigma_{a \in A} w_a c_m p_m N_{m,t}^{a}$, wherein $w_a$ denotes a weight of the aggregator a as a percentage of an aggregator aggregation, $c_m$ denotes a cost per unit of capacity consumed by the flexible resource m within the current demand response, and $p_m$ denotes a capacity of the flexible resource m within the current demand response; and
    the constraints include: an aggregation allocation limitation of the start response time slot and the current response time slot for the flexible resource m, the aggregated allocation limitation being set as $$\begin{cases} N_{m,t}^{a} \geq M_{m,t}^{a} \\ N_{m,t}^{a} - N_{m,t-1}^{a} \leq M_{m,t}^{a} \end{cases};$$

a limitation for a count of aggregated allocations and dispatches for the flexible resource m, the limitation for the count of aggregated allocations and dispatches being set as $\Sigma_{t \in T} \Sigma_{a \in A} M_{m,t}^{a} \leq 1$; a maximum response duration limitation for the flexible resource m, the maximum response duration limitation being set as $\Sigma_{a \in A} \Sigma_{t \in T} N_{m,t}^a \leq T_m^{max}$, wherein $T_m^{max}$ is a maximum response duration of the flexible resource m; guaranteeing that flexible resources having a backward and forward coupling relationship are associated; a minimum response capacity limitation for the aggregator a, the minimum response capacity limitation being set as $\Sigma_{m \in M} N_{m,t}^a P_m \gamma_m \geq P_D^a$, wherein $P_D^a$ denotes a minimum response capacity required after aggregation of flexible resources of the aggregator a, and $\gamma_m$ denotes a confidence factor for timely response corresponding to the flexible resource m; a minimum response speed limitation and a minimum recovery speed limitation required after the aggregation of the flexible resources of the aggregator a, the minimum response speed limitation and the minimum recovery speed limitation being set as $$\begin{cases} \sum_{m \in M} N_{m,t}^a h_m^M \geq H_M^a, \\ \sum_{m \in M} N_{m,t}^a h_m^D \geq H_D^a, \end{cases}$$

wherein $h_m^M$ and $h_m^D$ denote a response speed and a recovery speed of the flexible resource m, respectively, and $H_M^a$ and $H_D^a$ denote an overall minimum response speed and a minimum recovery speed of the aggregator a, respectively;

the event-driven based demand rapid response and flexible resource optimal allocation module further includes:
  a perception layer configured to collect data from a data source, wherein the perception layer includes a device sub-layer and a monitoring sub-layer, the device sub-layer is connected to a smart device via a wireless network, the monitoring sub-layer monitors the smart device in real time via a monitoring device, and the device sub-layer communicates with the monitoring sub-layer via a standardized protocol, to generate demand response and flexible resource data in real time;
  an edge layer configured to perform event-oriented data integration, wherein the edge layer, based on a blockchain network with P2P as communication and an event processor driven by a smart contract, integrates and utilizes data flowing from the perception layer based on different events, and constructs an event-driven based demand rapid response and flexible resource optimal allocation process by analyzing an event-driven workflow; and
  a cloud layer configured to perform data processing to build a regulation center for multi-party negotiation scenarios and a data-driven computing center; the blockchain-based data collaboration module further includes:
  a demand response transaction processing sub-module configured to process demand response transactions initiated by consumers by adjusting a power supply plan and optimizing an electricity distribution strategy based on electricity demand data; and
  a cooperative agreement reaching sub-module configured to reach a cooperative agreement based on demand information from both supply and demand sides; the visualization management module further includes:
    a demand-side response adjustment sub-module is configured to recommend consumers to adjust their electricity consumption strategies to reduce electricity peaks based on the cooperative agreement.

2. The system of claim 1, wherein the event-driven based demand rapid response and flexible resource optimal allocation module further includes:
  a demand prediction sub-module configured to construct a demand prediction model based on day-ahead data of an edge-side flexible resource, determine a clearing result through real-time bidding with a power producer based on a prediction result of the demand prediction model, and release the clearing result in real-time to market players;
  a resource aggregation sub-module configured to coordinate a virtual power plant multi aggregator entity with the market players; and
  a distributed resource sub-module configured to coordinate an edge-side flexible resource entity with an industrial park operator.

3. The system of claim 1, wherein the blockchain-based data collaboration module further includes:
  a communication network construction sub-module configured to construct a communication network for the aggregators and edge-side users based on a blockchain peer-to-peer mechanism, and specify a user identity permission through a certificate mechanism;
  a transaction processing sub-module configured to perform a structured data processing on the flexible resources, implement off-chain transactions for the flexible resources, designate a transaction process as a relevant credential, and upload the relevant credential to a blockchain; and
  a smart contract sub-module configured to write an event-driven based flexible resource allocation mechanism into a smart contract, wherein the smart contract further provides at least a querying function, a flexible resource tracing function, a penalty for a breach event function, and a compensation for a breached event function.

4. The system of claim 1, wherein the visualization management module further includes:
  a business layer sub-module configured to construct a core event processor based on a blockchain and a smart contract in an event-oriented business layer and implement an event processing process driven by the smart contract; and
  an API Service layer sub-module configured to provide an interactive interface for different users in a user-oriented Application Program Interface (API) Service layer, wherein the user-oriented API Service layer includes a permission control function, an event registration function, and a service discovery function, and the API Service layer sub-module is further configured to perform a visualization processing on user preference data.

5. A method for blockchain-based virtual power plant management, applied to the system for blockchain-based virtual power plant management as claimed in claim 1, wherein the method is executed by the system, and the method comprises:

adjusting power supply and demand in real time according to power demand information and available resource information of an industrial park;

establishing a data sharing and transaction environment among various participants in a virtual power plant; and providing a user interface for displaying, in real time, operational status and power transactions of the virtual power plant in the user interface.

6. The method of claim 5, wherein the establishing a data sharing and transaction environment among various participants in a virtual power plant further includes:

performing a structured data processing of flexible resources, implementing off-chain transactions for the flexible resources, designating a transaction process as a relevant credential, and uploading the relevant credential to a blockchain.

7. The method of claim 6, wherein the adjusting power supply and demand in real time according to power demand information and available resource information of an industrial park further includes: after determining aggregators and flexible resources corresponding to different demand scenarios through an optimization model, implementing a flexible resource optimal allocation under the different demand scenarios, the optimization model including decision variables, an objective function, and constraints, wherein the decision variables at least include the allocation attribution for the demand response time slot of each of the aggregators, the aggregation allocation attribution being set as $M_{m,t}^a$, $N_{m,t}^a$, wherein $M_{m,t}^a$ denotes a state variable with a value between 0 and 1, representing a start response time slot of a flexible resource m and an aggregation allocation attribution of an aggregator a at the start response time slot, if the flexible resource m starts responding at a time slot t and is assigned to the aggregator a at the same time, $M_{m,t}^a=1$, otherwise $M_{m,t}^a=0$; $N_{m,t}^a$ is a state variable with a value between 0 and 1, representing a current response time slot of the flexible resource m and an aggregation allocation attribution of the aggregator a in the current response time slot, if the flexible resource m has responded at the time slot t and is assigned to the aggregator a, $N_{m,t}^a=1$, otherwise $N_{m,t}^a=0$, wherein $m \in M$, $t \in T$, and $a \in A$, M denotes a collection of the flexible resources, T denotes a collection of the demand response time slots, and A denotes a collection of the aggregators;

the objective function is a function for determining a minimum value of a unit aggregator's cost of a current demand response, the objective function being set as $f(a)=\Sigma_{t \in T} \Sigma_{m \in M} \Sigma_{a \in A} w_a c_m p_m N_{m,t}^a$, wherein $w_a$ denotes a weight of the aggregator a as a percentage of an aggregator aggregation, $c_m$ denotes a cost per unit of capacity consumed by the flexible resource m within the current demand response, and $p_m$ denotes a capacity of the flexible resource m within the current demand response; and the constraints include: an aggregation allocation limitation of the start response time slot and the current response time slot for the flexible resource m, the aggregated allocation limitation being set as $$\begin{cases} N_{m,t}^a \geq M_{m,t}^a \\ N_{m,t}^a - N_{m,t-1}^a \leq M_{m,t}^a \end{cases};$$

a limitation for a count of aggregated allocations and dispatches for the flexible resource m, the limitation for the count of aggregated allocations and dispatches being set as $\Sigma_{t \in T} \Sigma_{a \in A} M_{m,t}^a \leq 1$; a maximum response duration limitation for the flexible resource m, the maximum response duration limitation being set as $\Sigma_{a \in A} \Sigma_{t \in T} N_{m,t}^a \leq T_m^{max}$, wherein $T_m^{max}$ is a maximum response duration of the flexible resource m; guaranteeing that flexible resources having a backward and forward coupling relationship are associated; a minimum response capacity limitation for the aggregator a, the minimum response capacity limitation being set as $\Sigma_{m \in M} N_{m,t}^a P_m \gamma_m \geq P_D^a$, wherein $P_D^a$ denotes a minimum response capacity required after aggregation of flexible resources of the aggregator a, and $\gamma_m$ denotes a confidence factor for timely response corresponding to the flexible resource m; a minimum response speed limitation and a minimum recovery speed limitation required after the aggregation of the flexible resources of the aggregator a, the minimum response speed limitation and the minimum recovery speed limitation being set as $$\begin{cases} \Sigma_{m \in M} N_{m,t}^a h_m^M \geq H_M^a \\ \Sigma_{m \in M} N_{m,t}^a h_m^D \geq H_D^a \end{cases},$$

wherein $h_m^M$ and $h_m^D$ denote a response speed and a recovery speed of the flexible resource m, respectively, and $H_M^a$ and $H_D^a$ denote an overall minimum response speed and a minimum recovery speed of the aggregator a, respectively.

* * * * *